United States Patent
Tsubouchi et al.

[11] Patent Number: 5,905,449
[45] Date of Patent: May 18, 1999

[54] RADIO SWITCHING APPARATUS

[75] Inventors: Kazuo Tsubouchi; Jun Hozumi; Toshiyuki Azuma, all of Miyagi-ken, Japan

[73] Assignee: Kazuo Tsubouchi, Miyagi-ken, Japan

[21] Appl. No.: 08/811,811

[22] Filed: Mar. 6, 1997

[30] Foreign Application Priority Data

Mar. 12, 1996 [JP] Japan .................................. 8-055118

[51] Int. Cl.⁶ .................................................. H03H 9/64
[52] U.S. Cl. ............................... 340/825.69; 340/825.31; 340/825.34; 340/825.72; 333/151; 333/154; 333/133; 333/193; 333/194; 333/195; 333/196; 455/78
[58] Field of Search ................. 340/825.69, 825.31, 340/825.34, 825.72; 333/151, 154, 133, 193, 194, 195, 196; 455/78, 119

[56] References Cited

U.S. PATENT DOCUMENTS

| | | | |
|---|---|---|---|
| 4,506,239 | 3/1985 | Cho et al. ................................. | 333/154 |
| 4,752,709 | 6/1988 | Fujishima et al. ....................... | 333/151 |
| 4,794,622 | 12/1988 | Isaacman ................................ | 455/119 |
| 5,146,613 | 9/1992 | Anderson ................................ | 455/78 |
| 5,568,095 | 10/1996 | Hill ........................................ | 340/825.69 |

FOREIGN PATENT DOCUMENTS 08163664  6/1996  Japan .

*Primary Examiner*—Brian Zimmerman
*Assistant Examiner*—Yves Dalencourt
*Attorney, Agent, or Firm*—Brinks Hofer Gilson & Lione

[57] ABSTRACT

A radio switching apparatus is provided which is actuated upon reception of a radio signal and which is capable zero or near-zero standby electric power consumption. The radio switching apparatus includes a receiving antenna; a surface-acoustic-wave device to which a signal received by the antenna is fed and which extracts a specific pattern contained in the signal; a storing circuit for storing output electric power of the surface-acoustic-wave device; and a switch circuit which is turned on when the output voltage of the storing circuit exceeds a set value.

5 Claims, 5 Drawing Sheets

FIG. 2
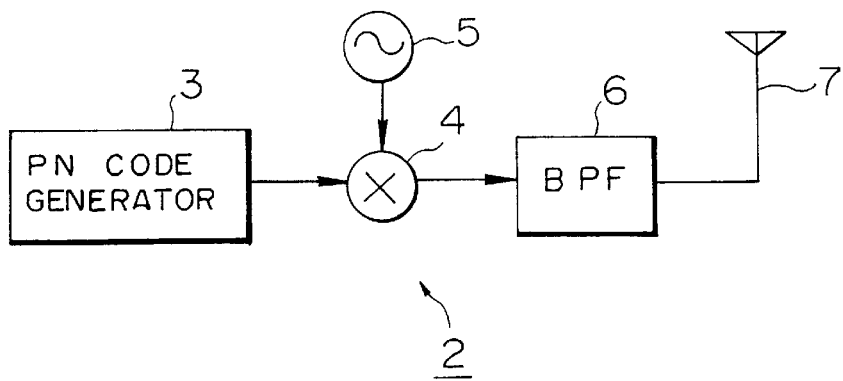
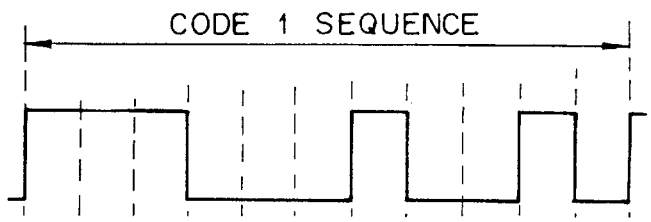
FIG. 3A  PN CODE
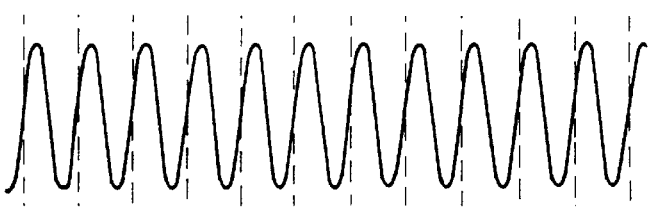
FIG. 3B  CARRIER
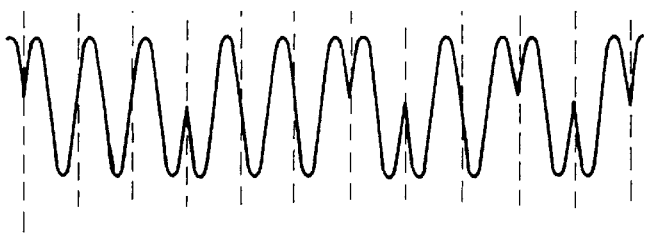
FIG. 3C  SPREAD SIGNAL

RADIO SWITCHING APPARATUS

BACKGROUND OF THE INVENTION

1. Field of the Invention

The present invention relates to a radio switching apparatus which achieves reduced consumption of electric power.

2. Description of the Related Art

In recent years, various radio application systems, for example, electric-power or gas meter reading systems using radio, or IC card systems using radio, have been researched. Here, the meter reading system using radio is designed to detect an amount of electric power, gas or the like used by driving a meter reading apparatus using radio in an automobile without a meter reading person going to the place where the meter is disposed.

Meanwhile, the major problem in such a system is consumption of standby electric-power. That is, in order to drive, for example, the meter reading apparatus using radio, it is necessary to continually have the meter reading apparatus in a standby state (a state in which radio waves can be received). For this purpose, a receiving circuit must continually be in an active state. However, if the receiving circuit is continually in an active state, electric power consumption increases. When, for example, the meter reading apparatus is driven by a small battery, the service life of the battery is extremely short because of the electric power consumption of the receiving circuit. In particular, in the case of an apparatus which is driven once per month like a meter reading apparatus, such wasteful consumption of electric power by the receiving circuit is very undesirable.

SUMMARY OF THE INVENTION

Accordingly, it is an object of the present invention to provide a radio switching apparatus which is actuated upon reception of a radio signal and which is capable zero or near-zero standby electric power consumption.

To achieve the above-described object, according to a first aspect of the present invention, there is provided a radio switching apparatus comprising: a receiving antenna; a surface-acoustic-wave device to which a signal received by the antenna is fed and which extracts a specific pattern contained in the signal; a storing circuit for storing output electric power of the surface-acoustic-wave device; and a switch circuit which is turned on when the output voltage of the storing circuit exceeds a set value.

According to a second aspect of the present invention, in the radio switching apparatus in accordance with the first aspect of the present invention, a SAW matched filter is used.

According to a third aspect of the present invention, in the radio switching apparatus in accordance with the second aspect of the present invention, the SAW matched filter is formed of an $Al_2O_3$ substrate, an AlN film formed on this $Al_2O_3$ substrate, and an Al tapping pattern formed on the AlN film.

According to a fourth aspect of the present invention, in the radio switching apparatus in accordance with the first aspect of the present invention, the storing circuit includes an LC tank circuit, rectifying means for rectifying an output of the LC tank circuit, and a capacitor for storing the output of the rectifying means.

According to a fifth aspect of the present invention, in the radio switching apparatus in accordance with the first aspect of the present invention, the switch circuit is formed of a semiconductor switch which is turned on when the output voltage of the storing circuit exceeds a set value, and switching means driven by this semiconductor switch.

According to a sixth aspect of the present invention, in the radio switching apparatus in accordance with the first aspect of the present invention, the switch circuit is formed of a light-emitting element which emits light when the output voltage of the storing circuit exceeds a set value, a semiconductor switch which is turned on upon reception of light from this light-emitting element, and switching means driven by the semiconductor switch.

The above and further objects, aspects and novel features of the invention will become more apparent from the following detailed description when read in connection with the accompanying drawings.

BRIEF DESCRIPTION OF THE DRAWINGS

FIG. 2 is a block diagram illustrating the construction of a transmission circuit for driving a switching apparatus of FIG. 1;

FIGS. 3A, 3B, and 3C are waveform charts of each section of the circuit shown in FIG. 2;

DESCRIPTION OF THE PREFERRED EMBODIMENT

Figure 1:
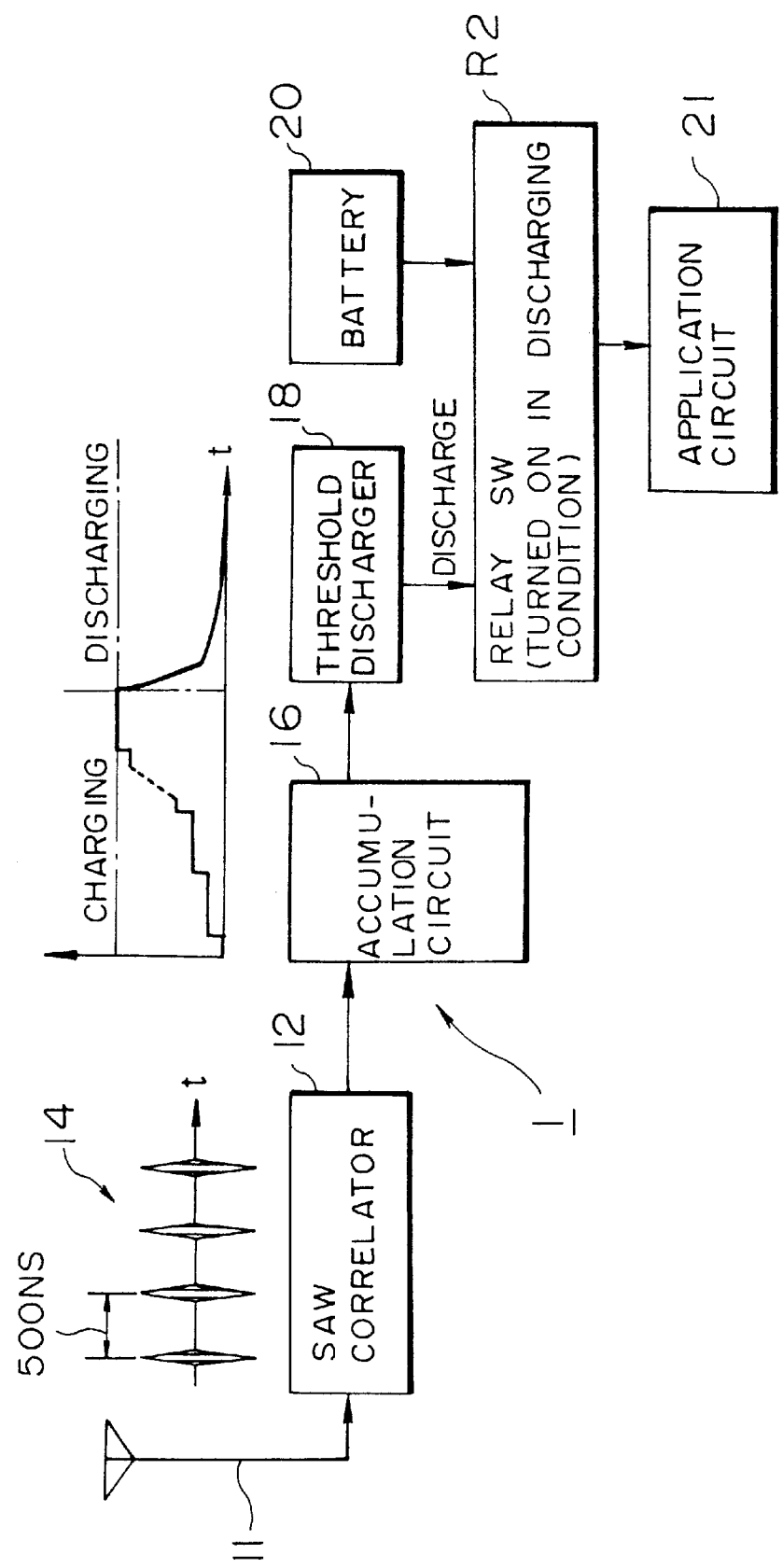
FIG. 1 is a block diagram illustrating the construction of an embodiment of the present invention.

The preferred embodiment of the present invention will be described below with reference to the accompanying drawings. FIG. 1 is a block diagram illustrating the construction of a radio switching apparatus 1 in accordance with an embodiment of the present invention. FIG. 2 is a block diagram illustrating the construction of a transmission circuit 2 for driving the radio switching apparatus 1. The radio switching apparatus 1 of this embodiment employs a spectral diffusion communication method.

The transmission circuit 2 will be described first. In FIG. 2, reference numeral 3 denotes a PN (pseudorandom noise) code generator. Here, the PN code is a pseudorandom noise code having a cyclic property, and M sequence, Barker sequence, Gold sequence and the like are known. The PN code generator 3 generates a PN code shown in FIG. 3A and outputs it to a modulation circuit 4. This PN code 11 shown in FIG. 3A is a 11-chip Barker code, and one cycle has the following structure: 11100010010.

Reference numeral 5 denotes an oscillation circuit which generates a carrier (carrier wave). The waveform of the carrier is shown in FIG. 3B. The modulation circuit 4 diffuse-modulates a carrier by a PN code and outputs it. FIG. 3C shows an output waveform of the modulation circuit 4. The output of the modulation circuit 4 is radiated from an antenna 7 via a band-pass filter 6.

This transmission circuit 2 is driven for a predetermined time when the radio switching apparatus 1 described below is driven, thereby transmitting a diffusion signal shown in FIG. 3C for a set time from the antenna 7.

Figure 4:
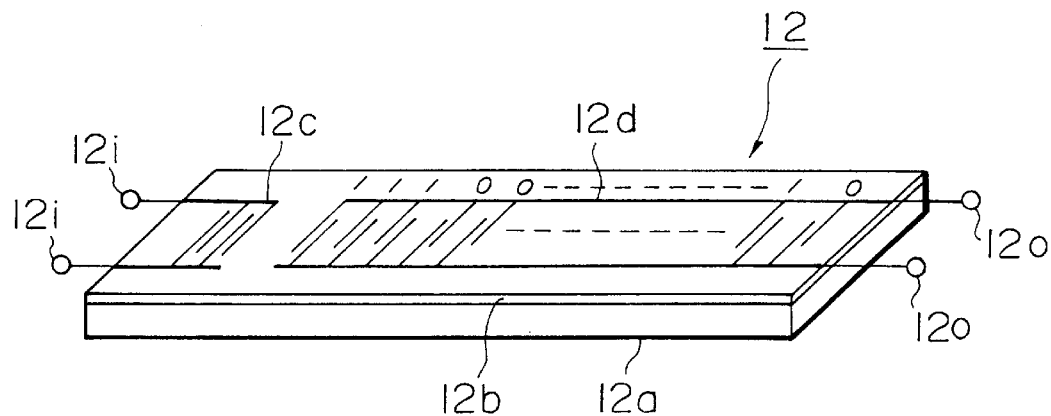
FIG. 4 is a perspective view illustrating the construction of a SAW correlator 12 in FIG. 1.

Next, in the radio switching apparatus 1, reference numeral 11 denotes a receiving antenna, and reference numeral 12 denotes a SAW correlator (SAW matched filter). SAW is an abbreviation for "surface acoustic wave." FIG. 4 is a perspective view illustrating the construction of the SAW correlator 12. In FIG. 4, reference numeral 12a denotes a substrate formed from $Al_2O_3$ (sapphire), and reference numeral 12b denotes an AlN (aluminum nitride) film formed on this $Al_2O_3$ substrate by an MO-CVD process. An Al (aluminum) input pattern 12c and an Al tapping pattern 12d are each formed on this AlN film by photolithography. Here, the Al tapping pattern 12d is a pattern corresponding to the above-described Barker code (11100010010).

When the diffusion signal shown in FIG. 3C is received by the receiving antenna 11 and fed to the input pattern 12c of the SAW correlator 12, the signal transforms into a SAW and propagates on the surface of the SAW correlator 12, and passes through the tapping pattern 12d. When the phase of the transmitted wave precisely coincides with the tapping pattern 12d, each wave amplitude is integrated, and a correlation peak which is 11 times as great appears at output ends 12o and 12o of the tapping pattern. More specifically, as indicated by reference numeral 14 in FIG. 1, a correlation peak appears every 11 cycles of the carrier at the output ends 12o and 12o of the SAW correlator 12. When the phase of the wave does not coincide with the tapping pattern 12d, the voltage of the output ends 12o and 12o becomes $\frac{1}{11}$ or less of the correlation peak. The output of this SAW correlator 12 is input to a storing circuit 16.

The propagation velocity of the $AlN/Al_2O_3$ structure shown in FIG. 4 is 1.5 to 2 times as great as that of other piezoelectric elements, e.g., approximately 6,000 m/sec, and thus the dimensions for processing can be enlarged. Further, the electromechanical coupling coefficient is relatively large, e.g., approximately 1%, and the propagation time temperature coefficient can be made zero; therefore, the $AlN/Al_2O_3$ structure is most suitable for a GHz-band SAW device material.

Figure 5:
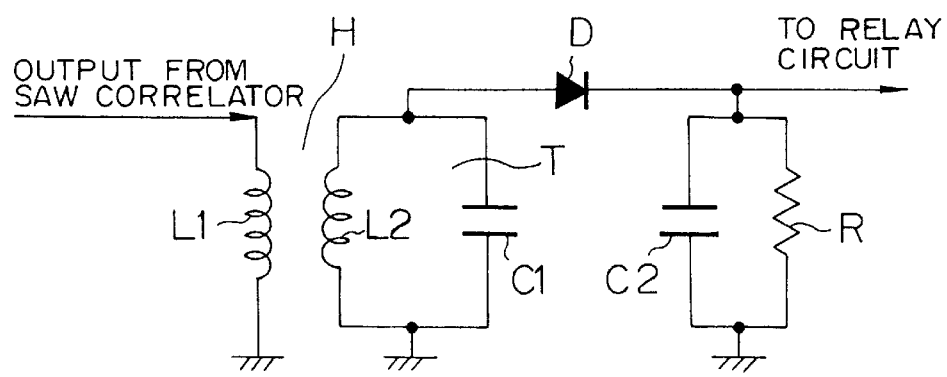
FIG. 5 is a circuit diagram illustrating the construction of a storing circuit 16 in FIG. 1.

The storing circuit 16, as shown in FIG. 5, comprises a high-frequency coil H formed of a primary coil L1 and a secondary coil L2, a tank circuit T formed of the secondary coil L2 and a capacitor C1 which are connected in parallel, a diode D for rectifying the output of the tank circuit T, a capacitor C2 for storing the output of the diode D, and a resistor R which is connected in parallel to the capacitor C2.

Figure 6A:
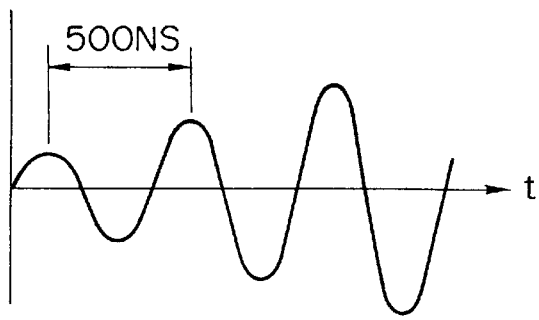
FIGS. 6A and 6B are waveform charts of each section of the circuit shown in FIG. 5.
Figure 6B:
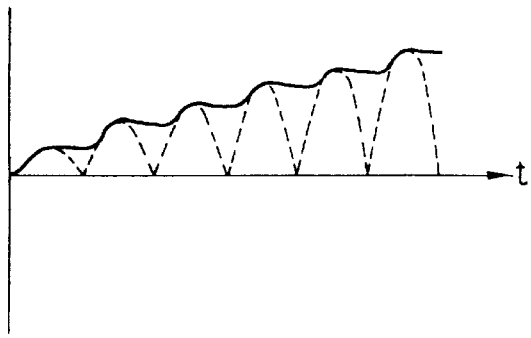

Here, the resonance frequency of the tank circuit T coincides with the frequency (2 MHz) of the correlation peak waveform output from the SAW correlator 12. As a result, only the correlation peak power components are taken and stored sequentially. FIG. 6A shows a voltage across the capacitor C1. The output voltage of the tank circuit T charges the capacitor C2 via the diode D. As a result, the voltage across the capacitor C2 increases sequentially as shown in FIG. 6B. The voltage of the capacitor C2 is applied to the threshold discharge unit 18.

Figure 7:
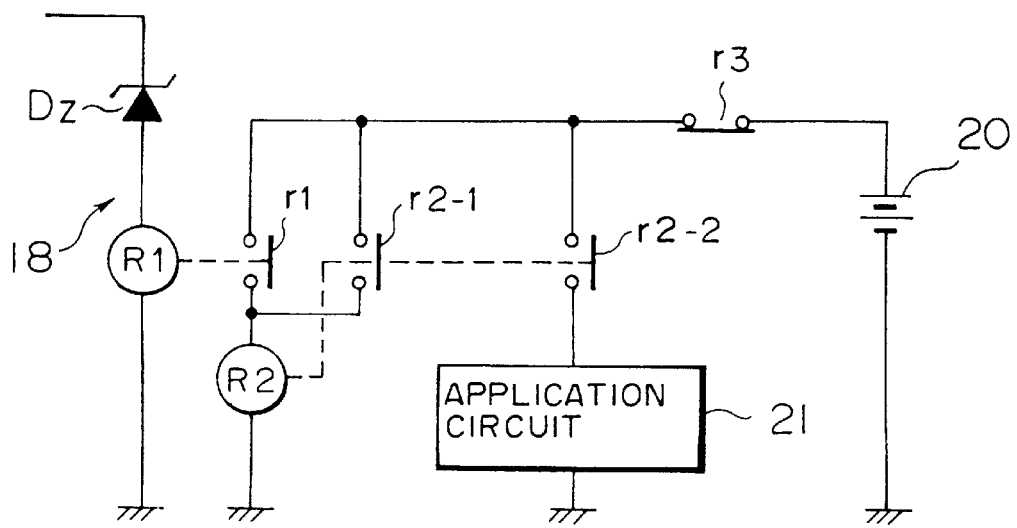
FIG. 7 is a circuit diagram illustrating a detailed construction of a threshold discharge unit 18, a relay switch R2, a battery 20, and an application circuit 21.

The construction of the threshold discharge unit 18, the relay switch R2, the battery 20, and the application circuit 21 is shown in FIG. 7. The threshold discharge unit 18 is formed of a Zener diode Dz and a relay switch R1 which is connected in series with the Zener diode Dz. Here, a relay switch having a small electric power consumption (e.g., 50 mw) is used for the relay switch R1. When the output voltage of the storing circuit 16 exceeds the Zener voltage of the Zener diode Dz, the Zener diode Dz is turned on, causing the relay switch R1 to be driven and a contact r1 to be turned on. As a result, the voltage of the battery 20 is supplied to the relay switch R2, causing the relay switch R2 to be driven and contacts r2-1 and r2-2 to be turned on. When the contact r2-1 is turned on, the relay switch R2 is self-held. Further, when the contact r2-2 is turned on, the voltage of the battery 20 is supplied to the application circuit 21, causing the application circuit 21 to be driven. When the operation of the application circuit 21 terminates, the application circuit 21 causes a contact r3 to be turned off. As a result, the relay switch R2 is turned off, switching off the supply of voltage to the application circuit 21.

The foregoing are the details of the embodiment shown in FIG. 1. According to this embodiment, the radio switching apparatus is not actuated unless the phase of the SAW based on the received signal does not completely coincide with the Al tapping pattern 12d of the SAW correlator 12. Therefore, there are advantages in that risk of malfunction is extremely small and reliability is high. Further, as long as the relay switch R1 is not driven, the circuit of the battery 20 is completely shut off mechanically by the contacts r1, r2-1 and r2-2. Therefore, electric-power leakage is theoretically zero, and electric power consumption from the battery 20 during standby can be made zero.

Figure 8:
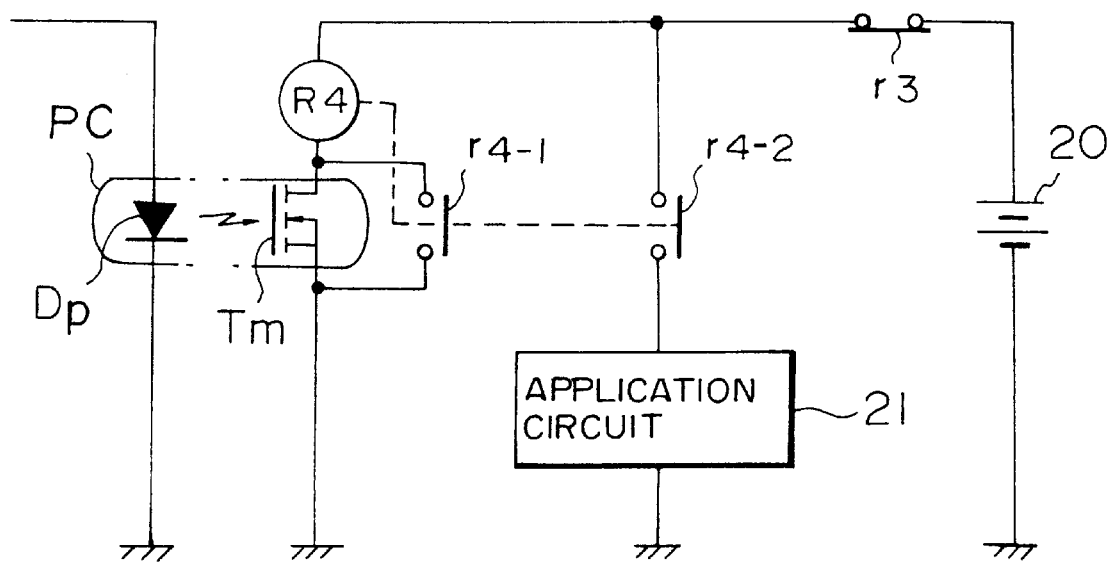
FIG. 8 is a circuit diagram illustrating an example of the construction of the circuit shown in FIG. 7.

In order to improve sensitivity, in place of the circuit in FIG. 7, a circuit in FIG. 8 may be used. In this circuit in FIG. 8, in place of the Zener diode Dz and the relay switch R1 in FIG. 7, a photocoupler PC formed of a light-emitting diode Dp and a MOS-type phototransistor Tm is used. In the case of this circuit, when the output voltage of the storing circuit 16 exceeds the forwardly dropping voltage of the light-emitting diode Dp, the diode Dp is turned on and emits light. Upon receiving this light, the phototransistor Tm is turned on. As a result, a relay switch R4 is driven, causing contacts r4-1 and r4-2 to be turned on. When the contact r4-1 is turned on, the relay switch R4 is self-held, and when the contact r4-2 is turned on, the voltage of the battery 20 is supplied to the application circuit 21.

According to this circuit in FIG. 8, it is possible to drive the relay switch R4 at a lower output voltage from the storing circuit 16 than the circuit in FIG. 7. In the case of this circuit, during standby, a leakage current flows through the relay switch R4 and the phototransistor Tm. However, the leakage current of the phototransistor Tm is 100 pA or less. Therefore, also in the case of this circuit, it is possible to make the standby electric power substantially zero.

As has been described up to this point, according to the present invention, there is provided a radio switching apparatus, comprising a surface-acoustic-wave device to which a signal received by the antenna is fed and which extracts a specific pattern contained in the signal; a storing circuit for storing output electric power of the surface-acoustic-wave device; and a switch circuit which is turned on when the output voltage of the storing circuit exceeds a set value. Thus, it is possible to provide a radio switching apparatus which has high reliability and, moreover, is capable of achieving zero electric power consumption during standby.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A radio switching apparatus, comprising:

a receiving antenna;

a surface-acoustic-wave matched filter to which a signal received by said antenna is fed and which extracts a specific pattern contained in said signal;

a storing circuit for storing output electric power of said surface-acoustic-wave matched filter; and a switch circuit which is turned on when the output voltage of said storing circuit exceeds a set value.

2. A radio switching apparatus according to claim 1, wherein said surface-acoustic-wave matched filter is formed of an $Al_2O_3$ substrate, an AlN film formed on said $Al_2O_3$ substrate, and an Al tapping pattern formed on said AlN film.

3. A radio switching apparatus according to claim 1, wherein said storing circuit includes an LC tank circuit, rectifying means for rectifying an output of said LC tank circuit, and a capacitor for storing the output of said rectifying means.

4. A radio switching apparatus according to claim 1, wherein said switch circuit includes a semiconductor switch which is turned on when the output voltage of said storing circuit exceeds a set value, a and switch means driven by the semiconductor switch.

5. A radio switching apparatus according to claim 1, wherein said switch circuit includes a light-emitting element which emits light when the output voltage of said storing circuit exceeds a set value, a semiconductor switch which is turned on upon receiving light from the light-emitting element, and switch means driven by the semiconductor switch.

* * * * *

UNITED STATES PATENT AND TRADEMARK OFFICE
CERTIFICATE OF CORRECTION

PATENT NO. : 5,905,449
DATED : May 18, 1999
INVENTOR(S) : Tsubouchi et al.

It is certified that error appears in the above-identified patent and that said Letters Patent is hereby corrected as shown below:

In the Claims

In claim 4, line 4, delete "a" (second occurrence).

Signed and Sealed this

Twenty-first Day of December, 1999

Attest:

Q. TODD DICKINSON

Attesting Officer    Acting Commissioner of Patents and Trademarks